United States Patent [19]
Laundrie

[11] 3,814,240
[45] June 4, 1974

[54] SEPARATION OF THERMOPLASTIC FILM AND WASTEPAPER

[75] Inventor: James F. Laundrie, Madison, Wis.

[73] Assignee: The United States of America as represented by the Secretary of Agriculture, Washington, D.C.

[22] Filed: Sept. 13, 1972

[21] Appl. No.: 288,761

[52] U.S. Cl.................... 209/11, 209/11, 241/24, 241/23, 241/65
[51] Int. Cl............................................. B07b 13/00
[58] Field of Search.............................. 209/2–5, 7, 209/9, 11, 238; 241/17, 23, 24, 65, 68

[56] References Cited
UNITED STATES PATENTS

| | | | |
|---|---|---|---|
| 2,494,153 | 1/1950 | Andrews et al.................. | 209/11 X |
| 3,315,806 | 4/1967 | Sigwart et al..................... | 209/11 X |
| 3,447,678 | 6/1969 | Henry............................... | 209/11 X |
| 3,510,067 | 5/1970 | Beck et al......................... | 241/17 |
| 3,599,788 | 8/1971 | Fyfe et al.......................... | 209/11 |
| 3,650,396 | 3/1972 | Gillespie et al.................. | 209/11 X |

Primary Examiner—Frank W. Lutter
Assistant Examiner—Ralph J. Hill

[57] ABSTRACT

A process of transporting, in suspension, a mixture of wastepaper and thermoplastic film in a hot gas stream causing the thermoplastic film to contract upon itself and form particles, thereby decreasing its specific surface to such an extent as to allow removal of the contracted plastic particles from the mixture by standard mechanical methods, such as air classification or screening. The process effectively removes all thermoplastic film from the wastepaper thus allowing for more efficient paper utilization through higher recycling rates.

3 Claims, 2 Drawing Figures

SEPARATION OF THERMOPLASTIC FILM AND WASTEPAPER

A nonexclusive, irrevocable, royalty-free license in the invention herein described, throughout the world for all purposes of the United States Government, with power to grant sublicenses for such purposes, is hereby granted to the Government of the United States of America.

BACKGROUND OF THE INVENTION

1 Field of the Invention

This invention relates to removing thermoplastic film from a mixture of thermoplastic film and wastepaper with particular reference to a process utilizing heat generated specific surface reduction of the thermoplastic film. 2 Description of Prior Art:

Ecological and economic pressures have fostered a firm national resolve to substantially raise the current paper recycling rate above the present 19 percent. The need to efficiently sort products containing wood fibers from other materials is often frustrated by technological and cost obstacles. A major problem in recycling paper is the presence of thermoplastic film materials which, if not removed, limit recyclability by keeping paper quality low. Additionally, paper-making equipment is often adversely affected by the presence of thermoplastic film which gums up the heated surfaces of machinery.

A study of solid waste management in the U.S. reported 190 million tons of solid waste was collected from household, commercial, and industrial sources in 1969. Plastic wastes represented 3.9 million tons or 2 percent of the total. The plastics consisted of 55 percent polyolefin, 20 percent polystyrene, and 11 percent polyvinyl chloride, the balance being made up of all other plastics. (Environ. Reporter, Current Development, 2(6): 168-69, June 11, 1971). Thus, most plastics in solid waste are thermoplastic in nature, softening in the range of 150° to 250° F., which cellulosic materials easily withstand for short periods of time.

The present annual production of low-density polyethylene film is estimated at 0.8 million tons, with a 25 percent increase anticipated should the use of polyethylene refuse bags alone become generally accepted (1970-71 Modern Plastic Encyclopedia, "Trends in the Industry," Vol. 47, No. 10A, p. 6, McGraw-Hill, Inc., New York, N. Y.).

Currently employed methods for removing thermoplastic film from wastepaper range from hand sorting to methods utilizing heated metal surfaces to which thermoplastics adhere, such as found in U.S. Pat. No. 3,599,788. The thermoplastic is later scraped off the heated surface. Another method includes pulping in a wet system to disperse the fibers. This is coupled with a later screening operation.

The process invented is much quicker and more efficient than any of the above methods. Specific surface reduction is less complex than currently used dry methods and is therefore subject to fewer equipment malfunctions and breakdowns. Wet processes cannot effectively screen out the smaller plastic particles, whereas the inventive process does so efficiently. The main advantage over current methodology, however, lies in this invention's ability to process vastly larger quantities of paper and thermoplastic with correspondingly lower costs per unit processed.

A process to remove thermoplastic films from a mixture of thermoplastic film and wastepaper must meet the following criteria. First, it must be capable of removing all thermoplastic film to be commercially effective. Second, the process must be economically advantageous in that the resulting gains exceed the costs involved. It should also be inexpensive in relation to current methodology. Finally, the process should be simple, expedient, and environmentally safe.

SUMMARY OF THE INVENTION

The invention lies in a process of removing thermoplastic film from a mixture of thermoplastic film and wastepapers by utilizing heat induced specific surface reduction of the thermoplastic followed by suitable mechanical separation means, such as air classification or screening.

Thermoplastic film softens and contracts upon itself when transported, in suspension, in a stream of sufficiently heated gas. This contraction greatly decreases the specific surface (area per unit weight) of the thermoplastic film while paper in the mixture remains unaffected. The remaining materials, characterized by substantial differences in specific surface, are easily separated by suitable means, such as air classification or screening.

The process consists of feeding a mixture of thermoplastic film and wastepaper into an enclosed heating zone, for example, the interior of an agricultural crop dehydrator. A stream of heated gas is also fed into the heating zone. The mixture is carried through the enclosed heating zone in the hot gaseous stream during which time specific surface reduction of the thermoplastic film occurs. When the thermoplastic film is sufficiently contracted, as determined by length of time and internal temperatures within the zone, the mixture of what is now contracted plastic particles and dry wastepaper is carried out of the heating zone in the same hot gas stream by means of a blower and transported into a separation device such as a cyclone separator to allow collection of the mixture and dispersal of the hot gas. The collected mixture is then finally separated by any suitable mechanical means, such as air classification or screening, thereby removing the thermoplastic from the original mixture.

Accordingly, an object of this invention is a process to remove thermoplastic film from a mixture of thermoplastic film and wastepaper by specific surface reduction of the thermoplastic in a hot gaseous stream followed by suitable separation. A further object is the conservation of our natural wood resource by a process fostering better paper utilization through increased recycling efficiency. Still another object of this invention is the provision of a fast, simple, and inexpensive way to separate huge quantities of paper and thermoplastic film without endangering the environment.

DESCRIPTION OF THE PREFERRED EMBODIMENTS

Many variations are available to accomplish thermoplastic film specific surface reduction and later removal. To expedite demonstration of the process involved, however, readily available equipment was utilized. An agricultural crop dehydrator at a nearby farm and an air classifier and screen at the City of Madison's refuse reduction plant were used.

Figure 1:
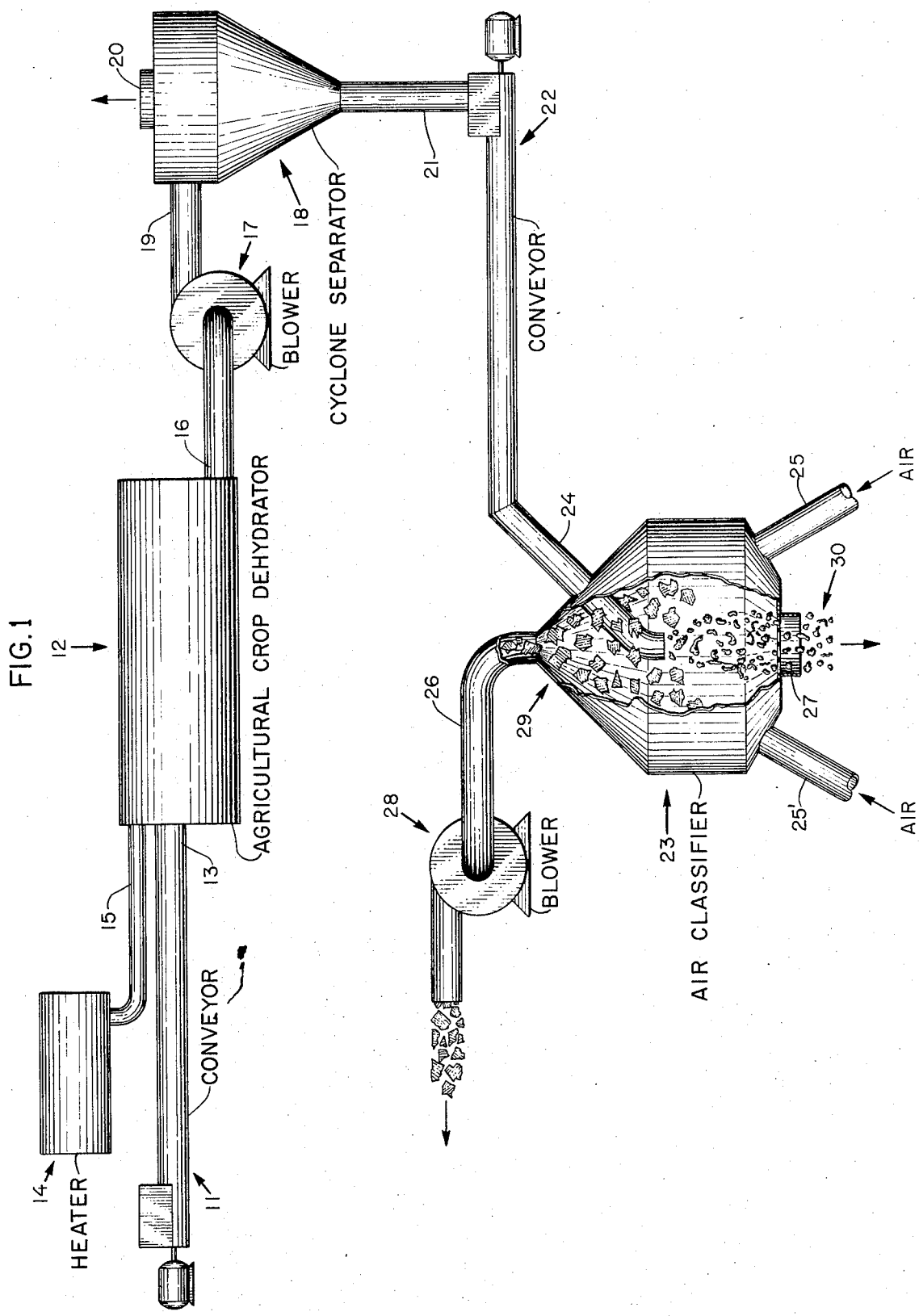
FIG. 1 is a diagrammatic representation of a flow through the major elements of the process. The representation is not inclusive but embodies only those elements and features present in the inventor's actual experimentation.

Referring to FIG. 1, the mixture of wastepaper and thermoplastic film is deposited onto a carrier means, here shown as conveyor 11. The mixture enters the enclosed heating zone, here shown as agricultural crop dehydrator 12, at entry point 13. The necessary hot gas stream, generated in the illustration by heater 14, is transmitted into dehydrator 12 at entry point 15. As the mixture is transported in suspension by the hot gas stream within dehydrator 12 the thermoplastic film contracts upon itself thereby reducing its specific surface while the wastepapers are merely dried out or otherwise unaffected. The resultant mixture carried out of dehydrator 12 at exit point 16 consists of dried wastepapers 29 and contracted thermoplastic particles 30. The mixture is carried in the same gaseous stream through blower 17 and into a separation device here depicted as cyclone separator 18 at entry point 19. The hot gas and water vapor escape from separator 18 at exhaust 20, whereas the heavier paper and contracted plastic particles fall into the lower cone section of the separator and are discharged at truncated opening 21. The mixture of wastepaper and contracted plastic particles is then transported by any suitable means, here conveyor 22, and fed into an appropriate classification device, shown as air classifier 23, through feed tube 24. Air drawn through ducts 25 and 25' by blower 28 carry the lighter wastepaper 29 out exit duct 26 while the heavier contracted thermoplastic particles 30 gravitate to the bottom of air classifier 23 and are discharged at point 27.

Figure 2:
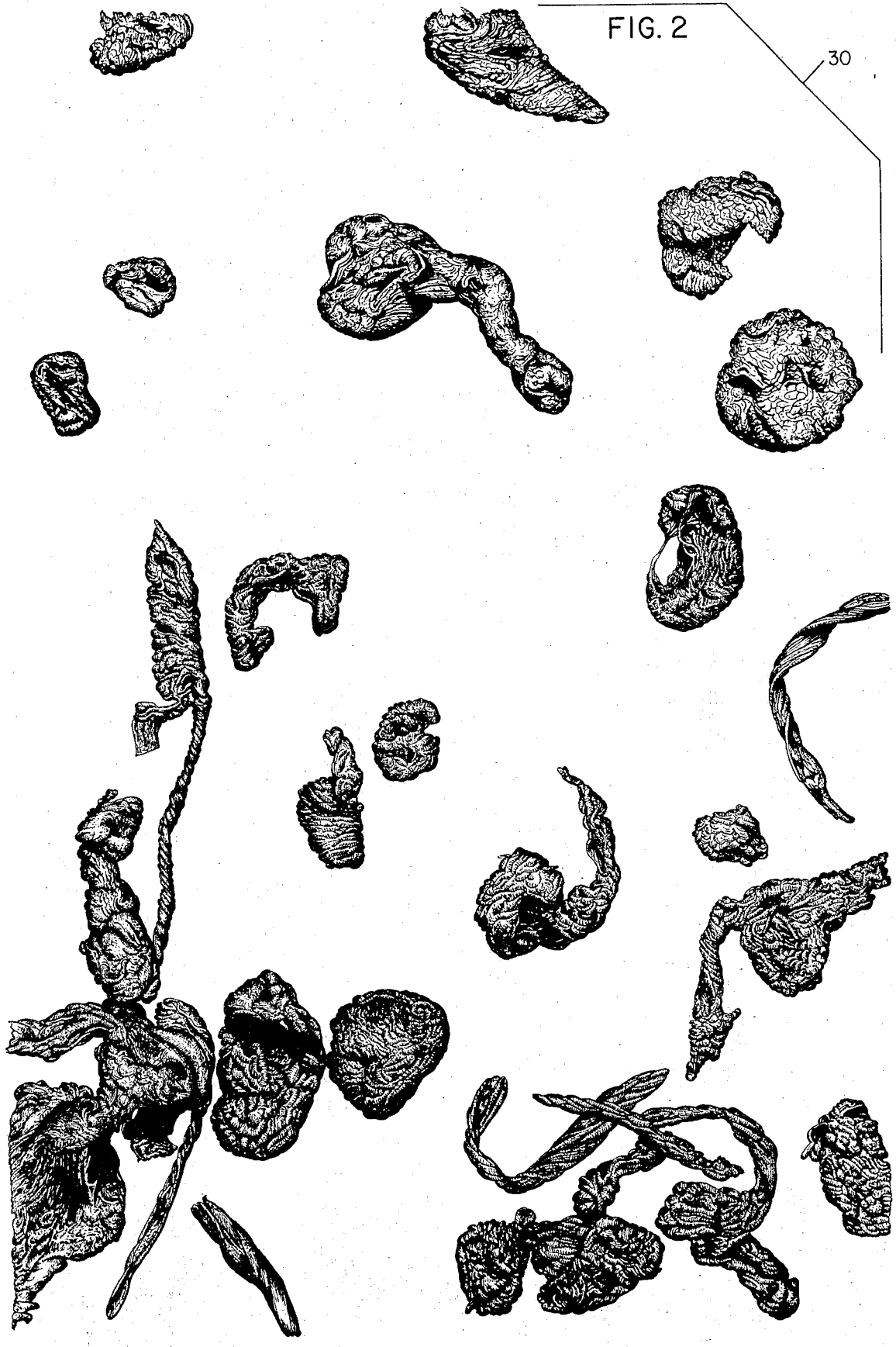
FIG. 2 is a representation of a sample of contracted thermoplastic particles following specific surface reduction.

FIG. 2 shows a sample distribution of contracted thermoplastic particles 30 that are discharged from the process at point 27. As can be seen, the thermoplastic assumes a variety of configurations upon contracting with balling, ribboning, and elongated spiraling shapes being predominant.

Actual size of the thermoplastic particles is approximately one-third smaller than particles 30 shown in FIG. 2.

To further illustrate this invention, the following examples are given.

Mixtures of shredded old newspapers and 6-inch squares of polyethylene in addition to light fractions of wastepapers and various thermoplastic films, air separated from com-minuted household trash, were processed to determine the effects of temperature, moisture, and thermoplastic film type.

EXAMPLE I

Eighteen hundred pounds of old newspapers and 77 pounds of 6-inch square low-density polyethylene film were passed through the City of Madison's vertical shaft hammermill for shredding. Ten samples weighing a total of 508 pounds were removed, and to the balance remaining, 266 pounds of water was added in 5 increments with the material being turned over by hand between each addition of water. Eighteen samples, weighing a total of 1,167 pounds were removed and the balance discarded. Moisture samples were taken and the shredded newspaper as received had a moisture content of 9.9 percent, while the moistened mixture contained 24.6 percent water.

The feed rate to the crop dehydrator was held constant at 10 pounds per minute. This rate was far below capacity but facilitated hand feeding and collection of the processed mixture in fiberboard boxes. While dehydrator retention time is dependent on many variables such as particle size and moisture content, the average elapsed time between placing the material on the feed conveyor and receiving the processed mixture from the cyclone was 20 seconds. Dehydrator outlet temperatures were measured using a thermocouple and recorded on a strip chart every 10 seconds.

Attempts to measure dehydrator inlet temperatures were futile since they fluctuated widely depending on such variables as outside temperatures, wind velocity, and warmup time.

Dehydrator outlet temperatures ranged from 124° to 379° F. during the numerous trials.

Regarding the moistened mixture, with a dehydrator outlet temperature of 124° F. the 6-inch polyethylene squares exited the dehydrator unchanged. At 193° F., polyethylene contraction had begun. At 250° F., contraction satisfactory to later separation was obtained. A still higher degree of contraction was obtained at 300° F., but no appreciable change was noted as the temperature was increased to 375° F.

Regarding the dry (9.9 percent moisture content) mixture, contraction was as complete at 250° F., as the moist mixture was at 300° F., indicating that as moisture content increases the temperature necessary to obtain the same degree of contraction also increases.

EXAMPLE II

Ten samples of light, paper-containing fraction weighing a total of 496 pounds were obtained from shredded household trash by air classification. This material was used as received without screening to remove dust and other fine, light particles. The average moisture content of this material was 12.0 percent.

The conditions of Example I were held constant for these trials except that the mixture was not processed below 250° F.

At 250° F., there was considerable contraction of the various thermoplastic film types, sufficient to permit successful separation of the thermoplastic and wastepaper. Contraction continues to occur, however, until the temperature has exceeded 325° F., indicating that some of the thermoplastic films in this material require a higher temperature to contract to the same degree that polyethylene contracts.

Except for the dehydrator trial made with the wet newspaper mixture at 124° F., removal of all contracted thermoplastic films was obtained by air classification. To ensure effective contraction, however, the dehydrator outlet temperature should exceed 250° F. At 375° F., a few of the samples caught fire while no fires occurred at 350° F. Since paper kindling temperatures generally fall in the range of 425° to 475° F., the fires indicate the dehydrator inlet temperatures were in that range when the outlet temperature was 375° F. Therefore, under the trial conditions with the particular dehydrator used, an outlet temperature of 350° F. should not be exceeded.

EXAMPLE III

Two additional batches of the light, paper-containing fraction, air classified from shredded household trash were also obtained, but these were screened on a ½-inch roundholed screen before processing through the dehydrator. One sample weighed about 600 pounds, while the other weighed 1,450 pounds as received. Moisture content of these samples was not determined.

The first trial using the 600-pound sample was made with a dehydrator outlet temperature of 325° F. After processing through the dehydrator, the material was again screened on a ½-inch diameter round-holed screen. Screening removed 62 percent of the contracted thermoplastic film present. The remainder of the contracted thermoplastic film was retained on the screen along with the wastepaper and was later removed by air classification.

Based on the combined dry weight of the contracted thermoplastic films and the wastepaper retained on the screen, the original mixture contained 7.4 percent contracted thermoplastic film.

The second trial using the 1,450-pound sample was made with a dehydrator outlet temperature of 300° F. All of this material was later air classified and the amount of contracted thermoplastic film removed was 9.8 percent based on the combined weight of the dried wastepaper collected and the contracted thermoplastic film.

An inspection following the numerous process trials revealed no plastic deposits in any of the equipment utilized.

These examples demonstrate that a process has been developed that effectively removes all thermoplastic film from a mixture of thermoplastic film and wastepaper.

Having thus disclosed my invention, I claim:

1. A process for removing thermoplastic film from a mixture of wastepaper and thermoplastic film which comprises:
   a. heating said mixture in a stream of hot gas to cause said film to contract upon itself to form particles, and
   b. mechanically separating the paper from the contracted thermoplastic particles.

2. A process for removing thermoplastic film from a mixture of wastepaper and thermoplastic film, comprising the steps of:
   a. comminuting said mixture;
   b. transporting said mixture into an enclosed heating zone;
   c. introducing a sufficiently hot gaseous stream into said zone to reduce the specific surface of said thermoplastic film by contraction upon itself to form particles;
   d. separating the mixture of wastepaper and contracted thermoplastic particles from said hot stream of gas; and
   e. mechanically separating the contracted thermoplastic particles from the wastepaper.

3. The process of claim 2 wherein the gas temperature in said heating zone is kept below the kindling temperature of the paper.

* * * * *